June 30, 1959    H. L. MOWBRAY    2,892,504
ROD WEEDER ATTACHMENT FOR AGRICULTURE IMPLEMENTS
Filed Aug. 8, 1956    2 Sheets-Sheet 1

Witness
Edward P. Seeley

Inventor
Harry L. Mowbray
by M. Talbert Dick
Attorney

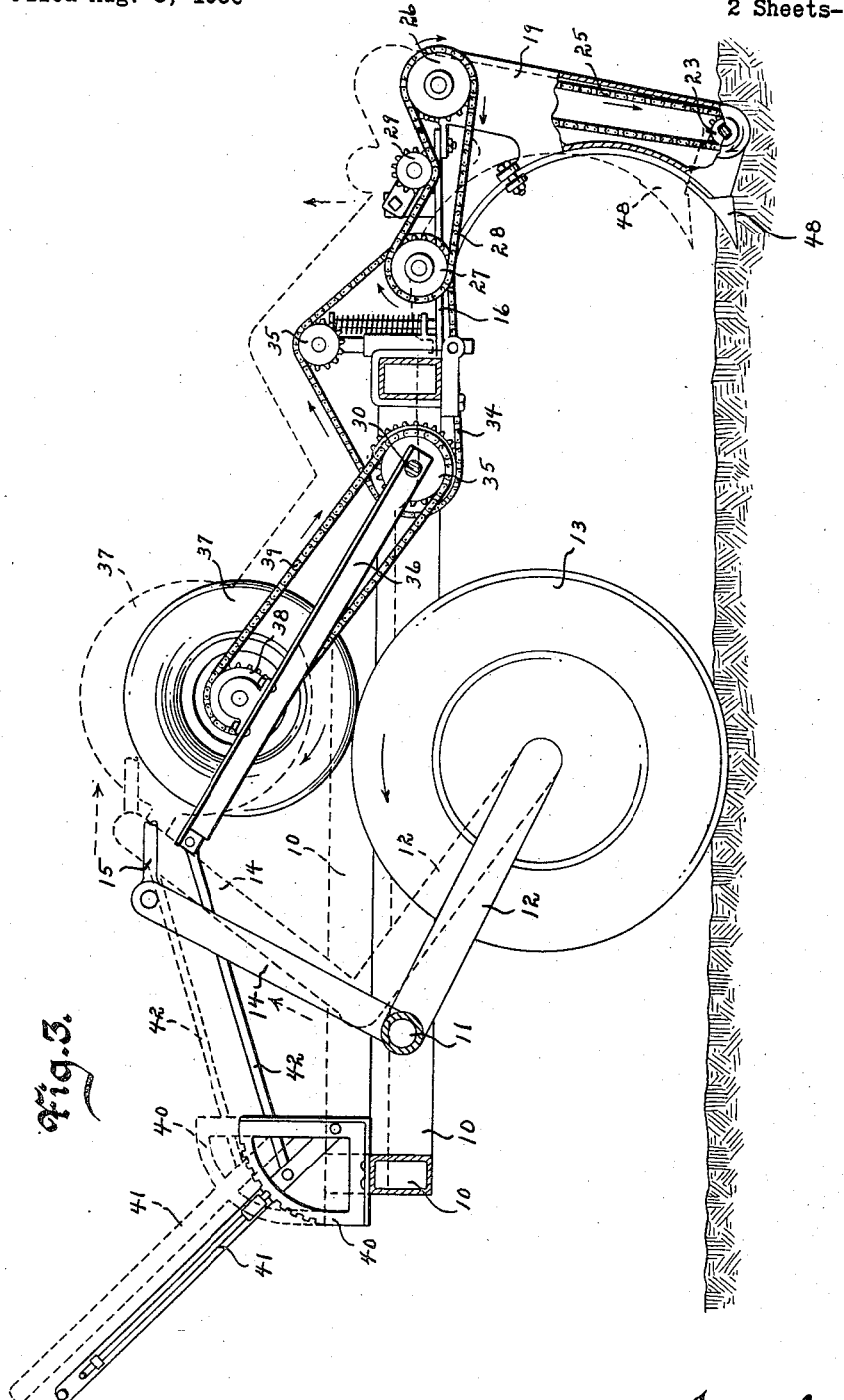

United States Patent Office 2,892,504
Patented June 30, 1959

2,892,504

ROD WEEDER ATTACHMENT FOR AGRICULTURE IMPLEMENTS

Harry L. Mowbray, Medford, Okla., assignor, by mesne assignments, to Rodweeder Sales, Inc., Joplin, Mont., a corporation of Montana Application August 8, 1956, Serial No. 602,722

3 Claims. (Cl. 172—44)

This invention relates to rotatable rod weeders and more particularly to their method of attachment and method of power driving.

The conserving of ground moisture is most necessary in many farming areas. This, of course, requires the destruction of non-productive vegetation such as weeds and like. Perhaps the most valuable tool for this purpose is the rod weeder which is an elongated horizontal rod, square in cross section and usually mounted for powered rotation to and back of a chisel plow. As is well known, chisel plows have a vertically adjustable frame, wheel supported, and with a plurality of shovel or plow portions secured to the frame and extending to the rear thereof. Such plows adequately condition the ground ahead of the rod weeder. However, without the rod weeder, many of the obnoxious weeds or undesirable vegetation are not killed, but merely transplanted, and continue to grow. By the use of a rod weeder, the weeds are brought to the surface and usually with the roots exposed and uppermost, in which condition they readily die.

While the above equipment gives excellent results, two problems arise, i.e., the power connection from the vehicle wheel to the frame, and the power connection from the frame to the rotatable weeder must be flexible, employing universal joints. Furthermore, the shafts must extend at an angle and the one leading from the frame to the weeder must penetrate the ground at a transverse angle to reach the rod weeder. This is not only a serious drag and loss of power, but the shaft that extends into the ground to the rod weeder, collects and winds up on itself, vegetation of every nature, thereby requiring constant cleaning. Furthermore, the lower universal joint must function below the earth's surface and rapidly wears out.

Some of these problems were solved by the disclosure in my co-pending application on a rod weeder attachment for agriculture implements filed July 22, 1953, Serial No. 369,572 now Patent No. 2,767,631. However, I have found that this specific structure did not embrace easy transportation, nor the automatic placement of the rod weeder into and out of power contact when the implement frame was lowered or raised.

Therefore one of the principal objects of this invention is to provide a rod weeder for use in conjunction with chisel plows that may be easily lowered or raised automatically with the plow for transportation purposes.

A further object of this invention is to provide a combination rod weeder and plow that when the plow is raised to a non-effective position the rod weeder will be automatically disconnected from its power source and when the plow is lowered for plowing purposes the rod weeder will automatically be connected to a power means.

A still further object of my invention is to provide a rod weeder and chisel plow that permits independent power control adjustment regardless of the adjustable position of the chisel plow.

A still further object of my invention is to provide a rod weeder attachment for plows that has no flexible shafts or universal joints for its power connections.

A further object of this invention is to provide a rod weeder for plows that is so power connected as to reduce drag to a minimum.

Still further objects of my invention are to provide a rod weeder attachment that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 3 is a side sectional view of one unit of my device on a chisel plow and more fully illustrates its construction.

In present day farming chisel plows are wheel supported and are very wide in order to process a wide strip of ground at one passing. Therefore, to accommodate such large implements, a plurality of power driving means is employed. Inasmuch as each power unit is a substantial duplicate of the other, I will describe only one power unit assembly, it being understood that any desired number may be used.

Figure 1:
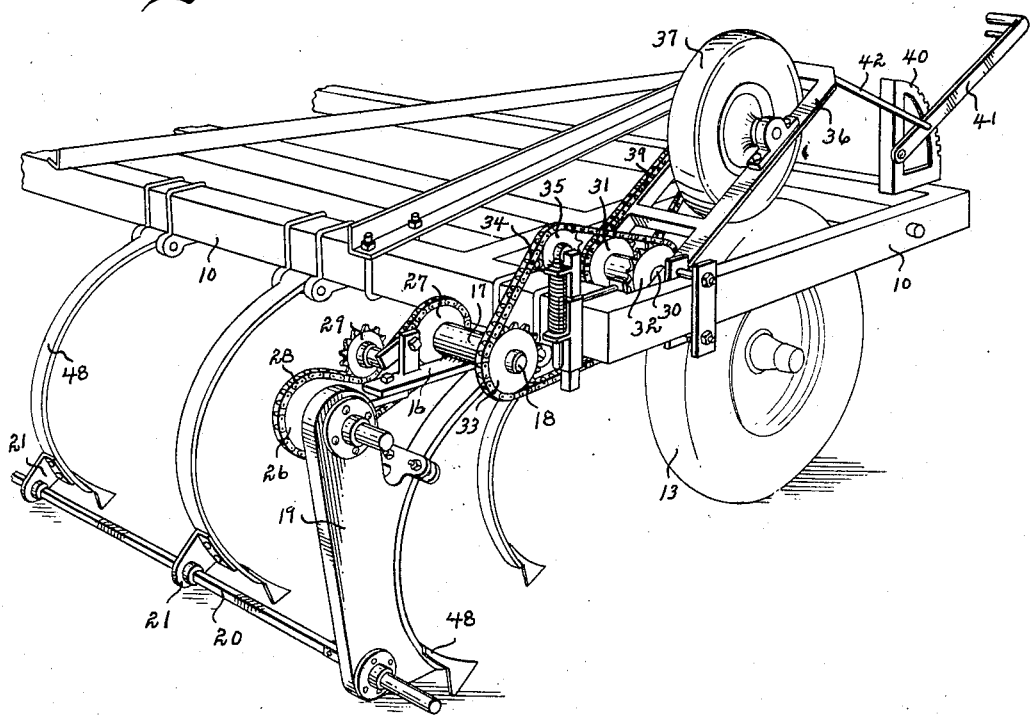
Fig. 1 is a perspective view of one unit of my weeder mounted on a chisel plow.
Figure 2:
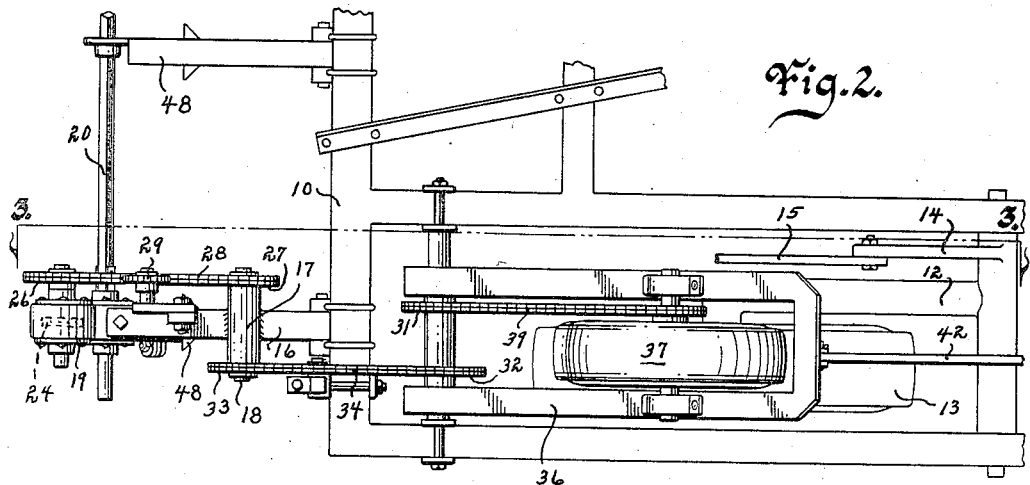
Fig. 2 is a top plan view of the gear portion of my rod weeder.

In these drawings I have used the numeral 10 to designate the frame portion of a chisel plow. Such frames have stub axles 11 for hingedly supporting the wheel arms 12. These arms 12 extend forwardly and downwardly to rotatably support the wheels 13. On all such plows, a lever means 14 is provided for lowering and raising the frame relative to the wheels. Such levers are a bell crank formed with the arm 12 and to which is operatively secured the shaft 15 of a hydraulic jack (not shown) or like. Thus when the shaft 15 is moved forwardly or rearwardly, the frame, relative to the supporting wheels, will be accordingly lowered or raised. Extending downwardly from the rear portion of the frame 10 are the usual chisel plow units 48. The numeral 19 designates an elongated rectangular gear housing secured by any suitable means on the back side of that chisel plow unit that is substantially back of the wheel 13, as shown in Fig. 2. It will be noted that the width of the gear box 19 is substantially that of the width of the chisel plow unit and that the gear box housing 19 extends downwardly to the back of the chisel plow so that when the chisel plow unit is in the ground as shown in Figs. 1 and 2, the lower end portion of the gear housing 19 will also be below the surface of the ground. By the gear box housing being of substantially the same width as the chisel plow unit and directly back of the same, it will not afford any material drag.

The numeral 20 designates the rod weeder per se which is an elongated rod substantially square in cross section. This member 20 is designed to rotatably extend through the lower portion of the gear housing 19 and through bearing members 21, which are detachably secured to the back lower end portions of a plurality of the chisel plow units 48 as shown in Fig. 1. At points where the rod 20 extends through or into the housing 19 and into or through the bearing members 21, the same may be rounded or if desired, may have round bearings 22 which I show in the drawings. The numeral 23 designates a sprocket wheel on the rod 20 and journaled in the lower portion of the housing 19. The numeral 24 designates a sprocket gear journaled in the upper portion of the housing 19. The numeral 25 designates an endless chain in the gear housing 19 and embracing the two sprocket wheels 23 and 24. The numeral 26 designates a sprocket wheel journaled on the upper outside of the gear box 19 and operatively connected to the sprocket wheel 24. The numeral 16 designates a brace extending from the top of the housing 19 to the frame 10 as shown in Fig. 3. The numeral 17 designates a bearing member on the brace 16 and through which rotatably extends the shaft 18. The numeral 27 designates a sprocket wheel on the shaft 18. The numeral 28 designates an endless chain embracing the sprocket wheels 26 and 27. The numeral 29 designates an adjustable idler sprocket wheel on the brace 16 and in engagement with the chain 28 for adjustably tightening the chain. The numeral 30 designates a shaft on the frame 10 and forward of the bearing member 17.

Rotatably mounted on this shaft and operatively secured together are the two sprocket wheels 31 and 32. The numeral 33 designates a sprocket wheel secured to the shaft 18. The numeral 34 designates an endless chain embracing the sprocket wheels 32 and 33. The numeral 35 designates a spring loaded sprocket wheel idler in contact with the chain 34 to maintain the same in taut condition. The numeral 36 designates an A-frame having its rear end pivoted on the shaft 30, as shown in Fig. 1. This frame extends forwardly and upwardly and over a wheel 13. Rotatably mounted in this A-frame and adapted to engage the top portion of the wheel 13 at times is a wheel 37. When this wheel 37 is in engagement with the wheel 13, the wheel 13 becomes a "bull" wheel for power driving the rod 20. The numeral 38 designates a sprocket wheel secured to the wheel 37. The numeral 39 designates an endless chain embracing the sprocket wheels 31 and 38. By this arrangement when the frame 10 is lowered to place the plows into the ground, the wheel 37 will normally also be lowered and will contact the wheel 13 and be rotated by the wheel 13 when the implement is pulled over the ground surface. If the wheel 37 is so rotated, it will rotate the sprocket wheel 38, which will rotate the chain 39, which will rotate the sprocket wheel 31, which will rotate the sprocket wheel 32, which will rotate the chain 34, which will rotate the sprocket wheel 33, which will rotate the sprocket wheel 27, which will rotate the chain 28, which will rotate the sprocket wheel 26, which will rotate the sprocket wheel 24, which will rotate the chain 25, which will rotate the sprocket wheel 23, and which will rotate the weeder rod 20. However, it is desirable to adjustably connect the A-frame 36 to the frame 10 for complete control. Therefore, on the forward portion of the frame 10 I have mounted an ordinary notched lever segment 40. The numeral 41 designates an ordinary lever handle hinged to the segment 40 and capable of selectively locking in any one of the segment notches. The numeral 42 designates a rod having one end pivoted to the lever 41 and its other end pivoted to the front end of the A-frame 36. This rod extends upwardly and rearwardly and when moved in one direction will raise the wheel 37 relative to the wheel 13, and when moved in the other direction will lower the wheel 37 toward the wheel 13. Thus, the chisel plows may be placed any desired depth into the ground by the adjusting rod 15 and then the lever 41 moved to bring and hold the wheel 37 in friction contact with the wheel 13. After such adjustment the raising of the chisel plows relative to the frame will also raise the wheel 37 from contact with the wheel 13 and when the chisel plows are again lowered to the same depth the wheel 37 will automatically be lowered onto the wheel 13. If the chisel plows are placed to a different depth in the soil, then and in that event the lever 41 will have to be readjusted accordingly. In some cases it may be desired to use the chisel plows and not the rod weeder. When this is the case the lever 41 may be used to raise and hold the wheel 37 out of contact with wheel 13. Therefore it will be seen that I have provided an adjustable controllable automatic power hookup for my rod weeder. The entire unit may be easily and quickly installed or removed. The brace 16, shaft 30, and even the housing 19 may be secured by standard bracket clamps and/or bolts.

My equipment may be easily and quickly placed on agricultural implements already in use or it can be manufactured on and sold with the ground conditioning unit. Inasmuch as the units 48 have spring characteristics, the spring loaded idler 29 is necessary as the unit 48 flexes. By the arrangement of sprocket wheels and shafts as shown I have eliminated undesirable flexible shafts and universal joints leading from the bull wheel 13. By placing the gear box 19 directly on and to the rear of one of the plows 48, power can be delivered downwardly to the rod weeder 20 directly and without interference in the pulling of the earth conditioner through the ground. Therefore, by this structure I have eliminated flexible shafts and universal joints connected to the rod weeder 20.

Furthermore, the gear mechanism is sealed inside the gear housing 19 and there is no wear from dust, grit or sand, such as found in flexible drive shafts and/or universal joints working below the ground surface. Furthermore, my entire power means is rotatably direct, thereby making my rod weeder operate with a great deal less power than weeders herebefore using flexible shafts and/or universal joints.

The gear box 19 may contain a lubricant and be sealed as shown in Fig. 3.

Although I have described and illustrated my rod weeder as particularly adapted for use on chisel plows, it is obvious that it may be placed on other types of earth conditioning machines.

From the foregoing it will be appreciated that I have provided an effective rod weeder and inasmuch as certain elements above described are also found in my heretofore designated co-pending application, Serial No. 369,572, now Patent No. 2,767,631, it is a continuation-in-part of the same.

Some changes may be made in the construction and arrangement of my rod weeder attachment for agriculture implements without departing from the real spirit and purpose of my invention, and it is my intention to cover by my claims, any modified forms of structure or use of mechanical equivalents which may be reasonably included within their scope.

I claim:

1. In an agriculture vehicle having a frame, at least one ground wheel, means for lowering and raising said frame relative to said wheel, the improvement of a power take-off comprising a drive wheel mounted on said frame capable of being driven by said ground wheel, an A-frame having one end hingedly connected to said vehicle frame and having a free end, said A-frame being positioned in vertical alignment with said ground wheel, a drive wheel rotatably mounted in said A-frame, a lever segment providing a plurality of notches secured to said vehicle frame and movable therewith, a lever carried by said lever segment, a rod having one end pivotally secured to said free end of said A-frame and its other end rigidly secured to said lever wherein said lever is capable of being selectively positioned in said notches to lock said drive wheel in a fixed position whereby said drive wheel is movable by the means for vertically adjusting said vehicle frame and whereby said means for raising and lowering said frame will disengage said drive wheel from said ground wheel when said drive wheel is engaged with said ground wheel in the lowered frame position when the frame is raised and will engage said drive wheel with said ground wheel when said frame is lowered.

2. A rod weeder attachment for agriculture vehicles having a frame, at least one ground wheel, a plurality of flexible members depending from said frame carrying earth engaging hoes, means for lowering said frame relative to said wheel to position said hoes in the ground and to raise said frame to retract said hoes, said rod weeder comprising an elongated gear box extending substantially the length of said flexible member and secured to the back thereof and being of a width substantially the same as the width of said flexible member, a rod journalled in the lower portion of said gear box rotatably journalled to the back of at least one of said flexible members, means within said gear box for rotating said rod, an A-frame having one end hingedly connected to said vehicle frame, said A-frame being positioned in vertical alignment with said ground wheel, a drive wheel rotatably mounted in said A-frame, means operatively connecting said drive wheel to said means in said gear box, and lever means capable of engaging and disengaging said drive wheel with said ground wheel and of securing said drive wheel in engagement with said ground wheel when said frame is lowered whereby said means for raising and lowering said frame will disengage said drive wheel from said ground wheel when said frame is raised and will engage said drive wheel with said ground wheel when said frame is lowered.

3. A rod weeder attachment for agriculture vehicles having a frame, at least one ground wheel, a plurality of flexible members depending from said frame carrying earth engaging hoes, means for lowering said frame relative to said ground wheel to position said hoes in the ground and to raise said frame to retract said hoes, said rod weeder comprising an elongated gear box extending substantially the length of said flexible member and secured to the back thereof and being of a width substantially the same as the width of said flexible member, a rod journalled in the lower portion of said gear box and rotatably journalled to the back of at least one of said flexible members, means within said gear box for rotating said rod, an A-frame having one end hingedly connected to said vehicle frame and having a free end, said A-frame being positioned in vertical alignment with said ground wheel, a drive wheel rotatably mounted in said A-frame, means operatively connecting said drive wheel to said means in said gear box, a lever segment providing a plurality of notches secured to said vehicle frame and movable therewith, a lever carried by said lever segment, a rod having one end pivotally secured to said free end of said A-frame and its other end rigidly secured to said lever, said lever being selectively positioned in said notches to lock said drive wheel in a fixed position whereby said drive wheel is movable with said frame and the means for raising and lowering said frame will disengage said drive wheel from said ground wheel when same is in engagement with the ground wheel in the lowered frame position when the frame is raised and will engage said drive wheel with said ground wheel when the frame is lowered.

References Cited in the file of this patent
UNITED STATES PATENTS

| | | |
|---|---|---|
| 1,338,204 | Wolfe | Apr. 27, 1920 |
| 1,531,526 | Thomas | Mar. 31, 1925 |
| 2,017,304 | Blackney | Oct. 15, 1935 |
| 2,208,894 | Coburn | July 23, 1940 |
| 2,362,374 | Heppner | Nov. 7, 1944 |
| 2,723,632 | Rowland | Nov. 15, 1955 |